US012773986B2

(12) United States Patent
Akimoto

(10) Patent No.: US 12,773,986 B2
(45) Date of Patent: Oct. 27, 2026

(54) VEHICLE CONTROL DEVICE AND VEHICLE CONTROL METHOD

(71) Applicant: TOYOTA JIDOSHA KABUSHIKI KAISHA, Toyota (JP)

(72) Inventor: Hikaru Akimoto, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/063,713

(22) Filed: Feb. 26, 2025

(65) Prior Publication Data

US 2026/0034981 A1 Feb. 5, 2026

(30) Foreign Application Priority Data

Aug. 1, 2024 (JP) ................................ 2024-125617

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/18154* (2013.01); *B60W 50/0097* (2013.01); *G08G 1/164* (2013.01); *G08G 1/167* (2013.01); *B60W 2420/403* (2013.01); *B60W 2420/408* (2024.01);
(Continued)

(58) Field of Classification Search
CPC ............. B60W 30/09; B60W 30/0956; B60W 30/18154; B60W 50/0097; B60W 2420/403; B60W 2420/408; B60W 2554/4041; B60W 2554/4042; B60W 2555/60; B60W 2556/45; B60W 30/0953; B60W 30/18159; B60W 2540/10; B60W 2540/12; B60W 2554/4026; B60W 2554/4029; B60W 2554/4043; G08G 1/164; G08G 1/167; G08G 1/166
See application file for complete search history.

(56) References Cited

U.S. PATENT DOCUMENTS 9,969,261 B2 5/2018 Kodama
10,045,173 B1 8/2018 Morimura et al.
(Continued)

FOREIGN PATENT DOCUMENTS

JP 2004046426 A * 2/2004
JP 2021140235 A * 9/2021 ........... B60W 30/08
(Continued)

*Primary Examiner* — Harry Y Oh
(74) *Attorney, Agent, or Firm* — SoraIP, Inc.

(57) ABSTRACT

A vehicle control ECU executes a collision avoidance preparation operation when there is a first moving object in the case where a host vehicle intends to make a left turn at an intersection, and when there is a second moving object in the case where the host vehicle intends to make a right turn at the intersection. The first moving object is a moving object that is not detected by a surrounding object detection device and that is approaching the intersection at a speed equal to or higher than a first threshold speed from the left side of the host vehicle. The second moving object is a moving object that is not detected by the surrounding object detection device and that is approaching the intersection at a speed equal to or higher than a second threshold speed from the right side of the host vehicle.

6 Claims, 6 Drawing Sheets

(51) Int. Cl.
*B60W 30/18* (2012.01)
*B60W 50/00* (2006.01)
*G08G 1/16* (2006.01)

(52) U.S. Cl.
CPC ............... *B60W 2554/4041* (2020.02); *B60W 2554/4042* (2020.02); *B60W 2555/60* (2020.02); *B60W 2556/45* (2020.02)

(56) References Cited

U.S. PATENT DOCUMENTS

| | | | | |
|---|---|---|---|---|
| 10,106,157 | B2 | 10/2018 | Sawada et al. | |
| 10,150,407 | B2 | 12/2018 | Takahashi et al. | |
| 10,696,297 | B2 | 6/2020 | Nguyen Van et al. | |
| 11,001,255 | B2 | 5/2021 | Fukuman et al. | |
| 11,110,937 | B2 | 9/2021 | Kinoshita et al. | |
| 2019/0001968 | A1 | 1/2019 | Yorifuji et al. | |
| 2019/0344828 | A1 | 11/2019 | Omori et al. | |
| 2019/0389488 | A1 | 12/2019 | Yamada et al. | |
| 2023/0303067 | A1 | 9/2023 | Duan | |
| 2023/0396958 | A1* | 12/2023 | Lund | H04W 4/027 |
| 2024/0116498 | A1* | 4/2024 | Somiya | B60W 50/12 |

FOREIGN PATENT DOCUMENTS

| | | | | | |
|---|---|---|---|---|---|
| JP | 2022-123691 | A | | 8/2022 | |
| WO | WO-2014192369 | A1 | * | 12/2014 | B60Q 1/525 |

* cited by examiner

VEHICLE CONTROL DEVICE AND VEHICLE CONTROL METHOD

CROSS-REFERENCE TO RELATED APPLICATION

This application claims priority to Japanese Patent Application No. 2024-125617 filed on Aug. 1, 2024. The disclosure of the above-identified application, including the specification, drawings, and claims, is incorporated by reference herein in its entirety.

BACKGROUND

1. Technical Field

The present disclosure relates to vehicle control devices and vehicle control methods that execute a preliminary operation for reducing the possibility of a collision of a host vehicle with a moving object, when the host vehicle makes a left turn or a right turn at an intersection.

2. Description of Related Art

When a host vehicle enters an intersection, a conventional device outputs first alert information when a moving object is determined to be located within a blind spot that is not visible from the host vehicle, and outputs second alert information when the object is determined not to be located within the blind spot. The severity of the alert of the first alert information is higher than the severity of the alert of the second alert information (see Japanese Unexamined Patent Application Publication No. 2022-123691 (JP 2022-123691 A)).

SUMMARY

However, the possibility that the host vehicle may collide with an object located within the blind spot varies depending on the "location, moving direction, and moving speed" of the object and the moving direction of the host vehicle at the intersection. Therefore, the level of the alert from the conventional device may be too high or too low.

The present disclosure was made to solve this issue. One object of the present disclosure is to provide a vehicle control device and a vehicle control method that can more appropriately execute a preliminary operation for avoiding a collision (collision avoidance preparation operation) when a host vehicle makes a left turn or a right turn at an intersection.

An aspect of the vehicle control device of the present disclosure is a vehicle control device including:

a surrounding object detection device (20, 30) configured to detect an object located around a host vehicle and acquire object information on the object; an assist execution device (51, 52, 53) configured to execute a collision avoidance assist operation for avoiding a collision between the object and the host vehicle; and a controller (10, 50) configured to cause the assist execution device to execute the collision avoidance assist operation when a collision determination condition is satisfied (S560: Yes). The collision determination condition is a condition that is satisfied when the object detected by the surrounding object detection device and the host vehicle are predicted to collide.

The controller is configured to execute either or both of a first operation (S345, S445, S550) and a second operation (S345, S445) when a specific situation occurs. The specific situation is either or both of a first situation and a second situation.

The first situation is a situation in which, when the host vehicle is approaching an intersection and intends to make a left turn at the intersection (S310: Yes), the controller recognizes, based on the object information and location information of a communication terminal held by a first moving object, that a first condition including a condition that there is the first moving object is satisfied (S315, S320: Yes, S335, S340: Yes). The first moving object is a moving object that is not detected by the surrounding object detection device because the moving object is located within a blind spot of the surrounding object detection device (S325: Yes, S330: Yes) and that is approaching the intersection at a speed equal to or higher than a first threshold speed from the left side of the host vehicle before the left turn.

The second situation is a situation in which, when the host vehicle is approaching an intersection and intends to make a right turn at the intersection (S410: Yes), the controller recognizes, based on the object information and location information of a communication terminal held by a second moving object, that a second condition including a condition that there is the second moving object is satisfied (S415, S420: Yes, S435, S440: Yes). The second moving object is a moving object that is not detected by the surrounding object detection device because the moving object is located within the blind spot of the surrounding object detection device (S425: Yes, S430: Yes) and that is approaching the intersection at a speed equal to or higher than a second threshold speed from the right side of the host vehicle before the right turn.

The first operation is an operation for changing the collision determination condition to a condition that is more likely to be satisfied than when the specific situation does not occur (S345, S445, S550), and the second operation is an operation for reducing the time from when the assist execution device is instructed to execute the collision avoidance assist operation until when the collision avoidance assist operation is actually started (S345, S445).

With this configuration, a moving object that is potentially highly likely to contact the host vehicle is identified for each of the case where the host vehicle makes a left turn at an intersection and the case where the host vehicle makes a right turn at an intersection. That is, in the case where the host vehicle intends to make a left turn, such a moving object is a moving object that is approaching the intersection at a speed equal to or higher than the first threshold speed from the left side of the host vehicle and that is located within the blind spot of the surrounding object detection device. In the case where the host vehicle intends to make a right turn, such a moving object is a moving object that is approaching the intersection at a speed equal to or higher than the second threshold speed from the right side of the host vehicle and that is located within the blind spot of the surrounding object detection device. When the first or second condition including the condition that there is such a moving object is satisfied, either or both of the first and second operations are executed as a preliminary operation for avoiding a collision.

Therefore, the vehicle control device of the above aspect can effectively reduce in advance the possibility that the host vehicle may contact a moving object when the host vehicle makes a left turn or a right turn at an intersection.

In the above description, in order to facilitate understanding of the present disclosure, names and/or signs used in the following embodiment are added in parentheses to the configurations of the disclosure corresponding to those of the embodiment. However, the components of the present disclosure are not limited to those of the embodiment defined by the names and/or signs. The present disclosure also encompasses a vehicle control method and a program thereof.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
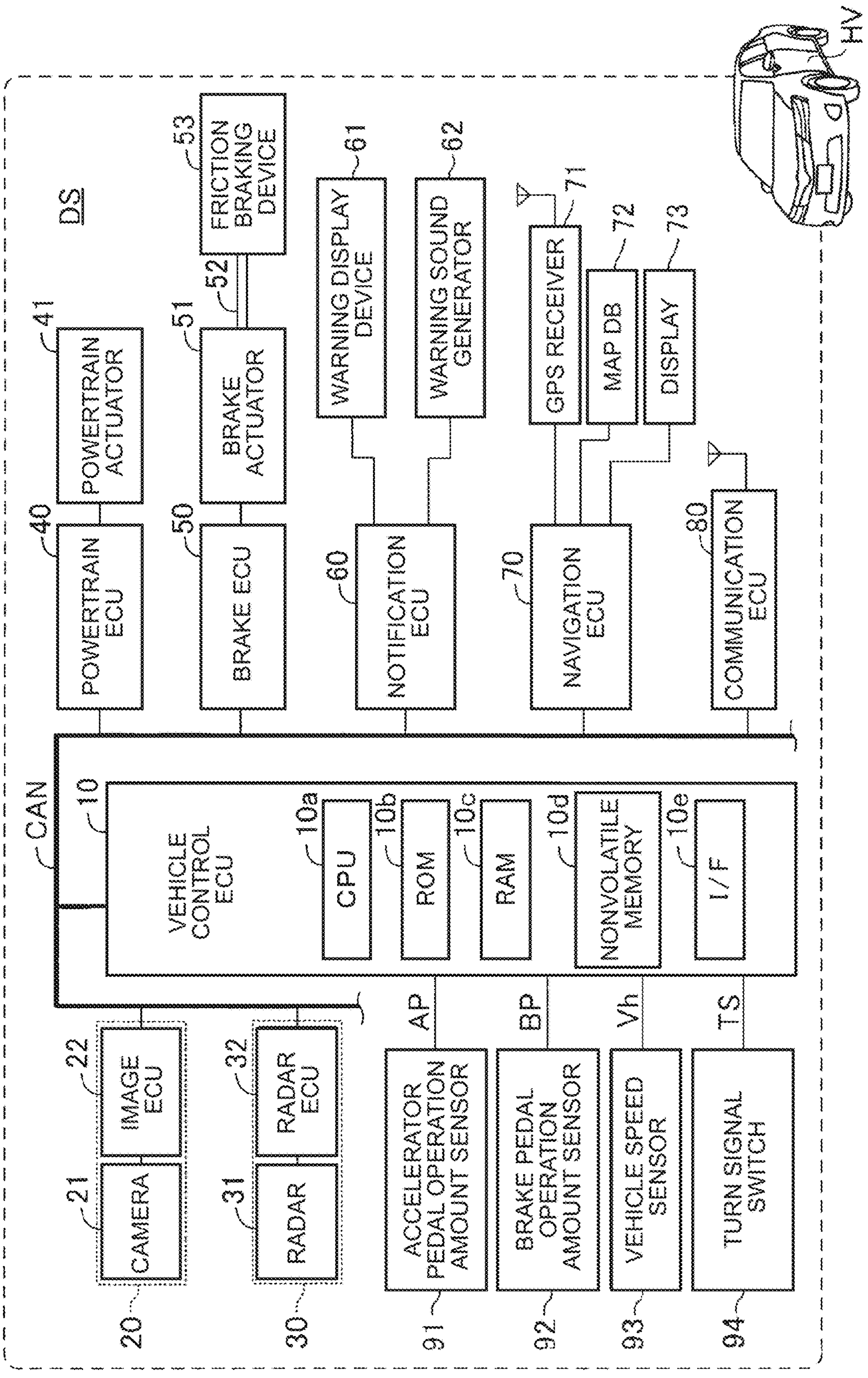
FIG. 1 is a schematic configuration diagram of a control device for a vehicle according to an embodiment of the present disclosure.

The "vehicle control device DS (device DS)" according to the embodiment of the present disclosure includes the components illustrated in FIG. 1, and is applied to the host vehicle HV. The host vehicle HV may be any of a vehicle using an internal combustion engine as a power source, a battery electric vehicle, a hybrid electric vehicle, and the like.

As used herein, "ECU" is an electronic control unit. The ECU includes a microcomputer including a CPU (processor), a ROM, a RAM, an interface, etc. The ECU are also referred to as controllers or computers. A plurality of ECUs shown in FIG. 1 is connected to each other through a CAN (Controller Area Network) so as to be able to exchange information. Part or all of these ECUs may be integrated into one ECU.

The vehicle control (driver assistance) ECU 10 executes "collision avoidance assist control (collision damage reduction control)" for reducing the possibility that the host vehicle HV collides with an object.

The camera device 20 includes a camera 21 and an image ECU 22. Each time a predetermined period of time elapses, the camera 21 captures a scene in front of the host vehicle HV and acquires image-data. The image ECU 22 generates camera information based on the image data from the camera 21, and transmits the camera information to the vehicle control ECU 10. The camera information includes camera object information and lane information. The camera object information includes "location, type, etc." of the object.

The radar device 30 is a device that acquires information about an object that is present in front of the host vehicle HV by using radio waves in a millimeter wave band. The radar device 30 includes a radar 31 and a radar ECU 32. Each time a predetermined time elapses, the radar 31 transmits millimeter waves within a predetermined detection range and receives millimeter waves reflected by the object. The radar 31 transmits the transmitted and received millimeter wave data to the radar ECU 32. The radar ECU 32 acquires radar information based on information from the radar 31. The radar ECU 32 transmits the radar data to the vehicle control ECU 10. The radar information includes a distance to the object, an orientation of the object, a relative velocity of the object, and the like. The vehicle control ECU 10 generates fusion object information by integrating radar information and camera information. The fusion object information includes a distance to the object, an orientation of the object, a relative velocity of the object, a type of the object, etc. The camera device 20 and the radar device 30 may be referred to as a "surrounding object detection device (surroundings monitoring device)" that detects an object located around the host vehicle.

The powertrain ECU40 drives the powertrain actuator 41 to control a driving device including a power source of a host vehicle HV, not shown, thereby generating a driving force.

The brake ECU 50 drives the brake actuator 51 to control the pressure of the hydraulic oil in the oil passage 52 and the hydraulic friction braking device 53, thereby applying a braking force to the host vehicle HV. Therefore, the brake ECU 50 can execute an automated brake that automatically applies a braking force to the host vehicle HV based on an instruction from the vehicle control ECU 10.

The notification (warning) ECU 60 causes the display device 61 in front of the driver's seat to display a symbol for a warning sound based on an instruction from the vehicle control ECU 10, and causes the warning sound generating device 62 to generate a warning sound.

The navigation ECU 70 includes a GPS receiver 71, a map database 72 storing map data, and a display touch panel 73. The navigation ECU 70 acquires the current location of the host vehicle HV based on GPS received by GPS receiver 71.

The communication ECU 80 communicates with a device (for example, a server such as an information managing center) outside the host vehicle HV using radio and network, and acquires various kinds of information from the external device.

The vehicle control ECU 10 receives the detected values (output values) of the following "sensors and switches".

- An accelerator pedal operation amount sensor 91 for detecting an accelerator pedal operation amount AP.
- A brake pedal operation amount sensor 92 that detects a brake pedal operation amount BP.
- A vehicle speed sensor 93 that detects a speed (that is, a vehicle speed) Vh of the host vehicle HV.
- A turn signal switch 94 for generating a signal indicating a blinking state of a turn signal of the host vehicle HV. When a turn signal lever attached to a steering column, not shown, is rotated in the counterclockwise direction, the turn signal switch 94 generates a signal for causing a left turn signal of the host vehicle HV to blink. When the turn signal lever is rotated in the clockwise direction, the turn signal switch 94 generates a signal for causing a right turn signal of the host vehicle HV to blink.

Overview of Operation

The operation of the device DS in an area with a law that requires vehicles to drive on the left side of the road will now be outlined. A "moving object other than a vehicle" such as a pedestrian and a bicycle is referred to as a "moving object". The moving object holds a communication terminal (e.g., a mobile phone). The communication terminal acquires its own location based on GPS signal, and transmits the location to the servers of the information management center.

Left Turn

Figure 2A:
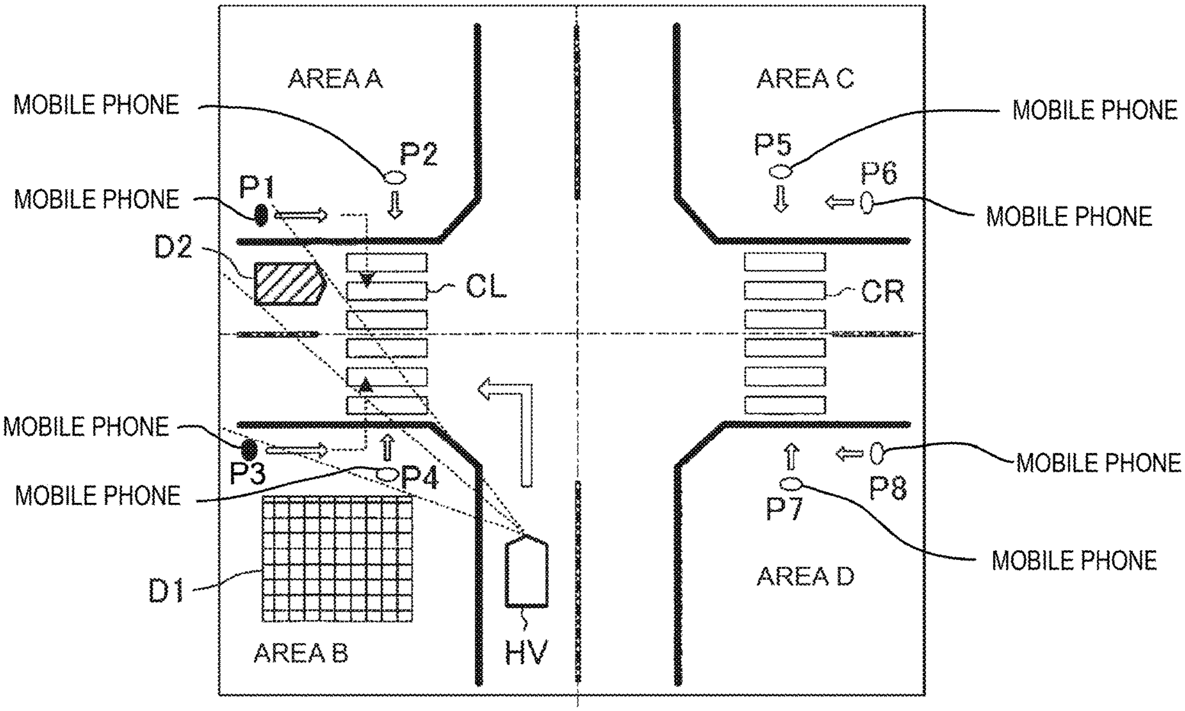
FIG. 2A is a plan view of an intersection when a host vehicle makes a left turn at an intersection in a left-side traffic area.

As shown in FIG. 2A, when the host vehicle HV is approaching the intersection and intends to make a left turn at the intersection, the host vehicle HV may approach the moving objects P1 to P4 that are trying to cross the crosswalk CL in the left turn.

Near the intersection, there may be other vehicles D2 waiting for a signal immediately before the structure D1 and the crosswalk CL. The structure D1 and the other vehicle D2 are "blind spot forming objects" that form a blind spot area for the driver of the surrounding object detection device and the host vehicle HV. The moving object P1 is within the blind spot area formed by the other vehicle D2, and the moving object P3 is within the blind spot area formed by the structure D1. Therefore, the moving object P1 and the moving object P3 may suddenly appear in front of the host vehicle HV after the host vehicle HV starts turning left. Therefore, the possibility that the host vehicle HV may contact the moving object P1 or P3 is higher than the possibility that the host vehicle HV may contact the moving object P2 or P4.

Therefore, the device DS determines whether the first condition (left turn condition) is satisfied when the host vehicle HV is approaching the intersection and intends to make a left turn. The first condition is satisfied when conditions L1 to L5 described below are satisfied. The device DS inquires of the servers whether the conditions L1 to L3 are satisfied. The server determines whether these conditions are satisfied based on the location information of the moving object transmitted from the communication terminal to the server. The server transmits the determination result to the device DS. The same applies to the conditions R1 to R3 described later.

Condition L1: The moving object is located near the "intersection the host vehicle HV is approaching."

Condition L2: The moving object that satisfies the condition L1 is moving from the left side of the host vehicle HV before the left turn toward the intersection. That is, the moving object satisfying the condition L1 is moving from left to right.

Condition L3: The speed of the moving object satisfying the condition L2 is equal to or higher than the first threshold speed.

Condition L4: The moving object satisfying the condition L3 is not detected by the surrounding object detection device.

Condition L5: There is a blind spot forming object between a moving object satisfying the condition L4 and the host vehicle HV.

When it is determined that the first condition is satisfied, the device DS determines that the first situation has occurred, and executes the "first operation and the second operation" described below as the collision avoidance preparatory operation so that the collision avoidance control can be executed at an earlier timing.

First Operation: The first operation is an operation of changing the collision determination condition to a condition that is likely to be satisfied. When the collision determination condition is satisfied, the device DS causes the display device 61 to display a warning, causes the warning sound generating device 62 to generate a warning sound, and activates "auto-braking as a collision avoidance assist operation".

Second Operation: The second operation is an operation for shortening a delay period from when the brake actuator 51 is instructed via the brake ECU 50 to when the braking force is actually applied to the host vehicle HV. More specifically, the device DS executes, as the second operation, an operation (i.e., a pre-filling operation) of increasing the pressure of the hydraulic oil in the oil passage 52 and the hydraulic friction braking device 53 to such an extent that no braking force is generated.

Right Turn

Figure 2B:
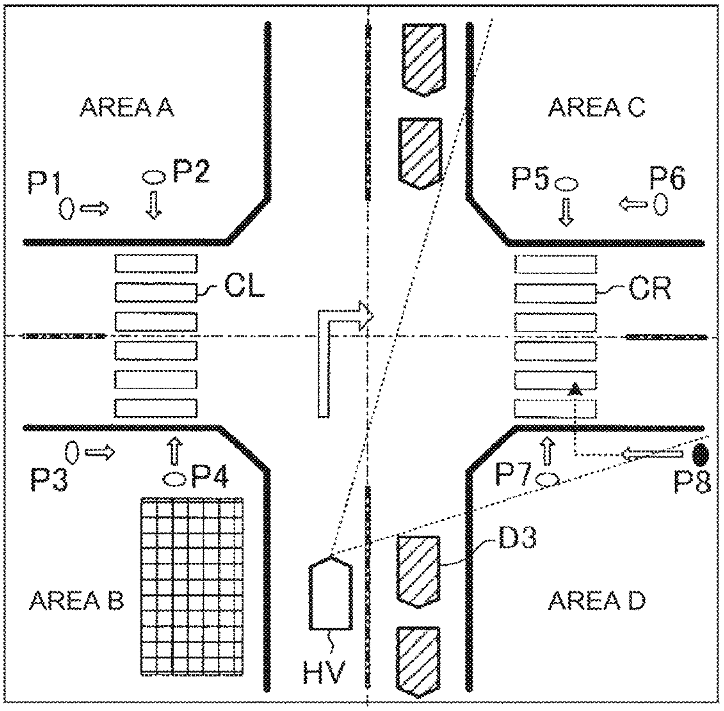
FIG. 2B is a plan view of an intersection when the host vehicle makes a right turn at an intersection in a left-side traffic area.

As shown in FIG. 2B, when the host vehicle HV is approaching the intersection and intends to make a right turn at the intersection, the host vehicle HV may approach the moving objects P5 to P8 that are trying to traverse the crosswalk CR in the right-turn direction.

Near the intersection, there may be another vehicle D3 stopped near the intersection due to traffic congestion. The other vehicle D3 is a "blind spot forming object" that forms a blind spot area for the driver of the surrounding object detection device and the host vehicle HV. In the embodiment shown in FIG. 2B, the moving object P8 is within the blind spot area formed by the other vehicle D3. Therefore, the moving object P8 may suddenly appear in front of the host vehicle HV after the host vehicle HV starts turning right. Therefore, the possibility that the host vehicle HV may contact the moving object P8 is higher than the possibility that the host vehicle HV may contact any of the moving objects P5 to P7.

Therefore, the device DS determines whether the second condition (right-turn condition) is satisfied when the host vehicle HV is approaching the intersection and intends to make a right turn. The second condition is satisfied when the conditions R1 to R5 described below are satisfied.

Condition R1: The moving object is located near the "intersection the host vehicle HV is approaching."

Condition R2: The moving object satisfying the condition R1 is moving from the right side of the host vehicle HV before the right turn toward the intersection. That is, the moving object satisfying the condition R1 is moving from right to left.

Condition R3: The speed of the moving object satisfying the condition R2 is equal to or higher than the second threshold speed. The second threshold speed may be the same as or different from the first threshold speed.

Condition R4: The moving object satisfying the condition R3 is not detected by the surrounding object detection device.

Condition R5: There is a blind spot forming object between a moving object satisfying the condition R4 and the host vehicle HV.

When it is determined that the second condition is satisfied, the device DS determines that the second situation has occurred, and executes the above "first operation and second operation".

Accordingly, the device DS can reduce the possibility that the host vehicle HV may contact the moving object when the host vehicle HV makes a left turn or a right turn at the intersection.

Specific Operation

The CPU 10*a* of the vehicle control ECU 10 (hereinafter, simply referred to as "CPU") executes the routines illustrated in the flow charts in FIGS. 3 to 5 every time a predetermined period (calculation cycle) dt elapses. In the following description, "step" is referred to as "S".

Left Turn and Straight Travel

Figure 3:
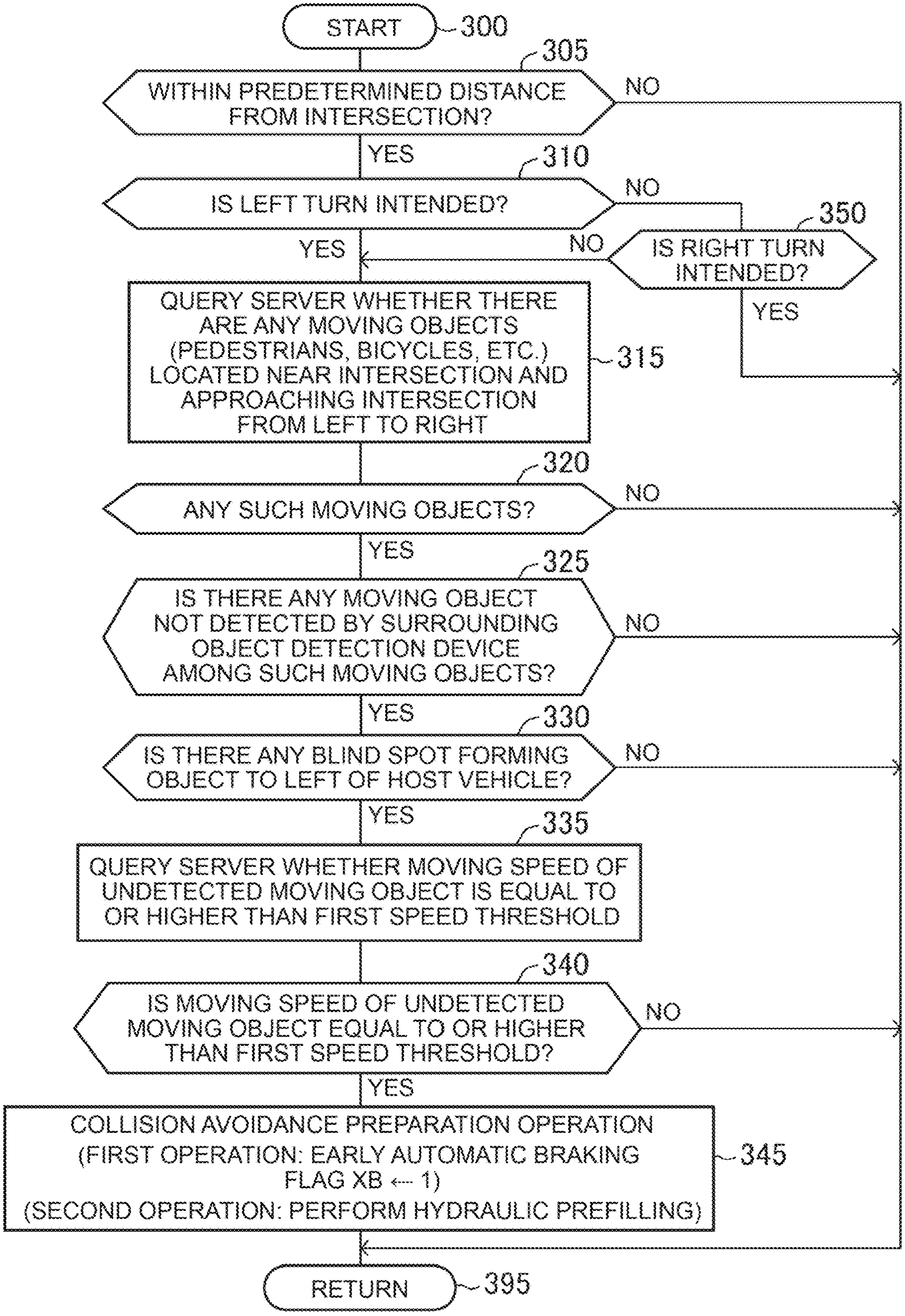
FIG. 3 is a routine that is executed by a CPU of the vehicle control ECU shown in FIG. 1.

At a predetermined timing, the CPU starts the process from S300 of FIG. 3 and proceeds to S305. In S305, the CPU determines whether the host vehicle is approaching the intersection and is located within a predetermined distance from the intersection, based on the information from the navigation ECU 70.

When the condition of S305 is satisfied, the CPU proceeds to S310 to determine whether the host vehicle intends to make a left turn. More specifically, the CPU determines whether the turn signal switch 94 is generating a signal for causing the left turn signal of the host vehicle HV to blink. The CPU may determine whether the host vehicle intends to make a left turn based on whether the in-vehicle navigation system guides a left turn at the intersection, or whether the host vehicle is traveling on a left-turn lane for the intersection.

When the condition of S310 is satisfied, the CPU proceeds to S315, and inquires of the servers whether there is a moving object (right-facing specific moving object) that is located near the intersection the host vehicle is approaching and that is moving from left to right toward the intersection. The CPU then determines, at S320, whether there is a right-facing specific moving object based on the answers from the servers.

When the condition of S320 is satisfied, the CPU proceeds to S325. The CPU determines whether there is a moving object that is not detected by the surrounding object detection device among the right-facing specific moving objects based on the location of the right-facing specific moving object, the current location of the host vehicle, and the fusion object information received from the server.

When the condition of S325 is satisfied, the CPU proceeds to S330. The CPU determines whether there is a blind spot forming object between the undetected right-facing specific moving object and the host vehicle HV based on the location information of the right-facing specific moving object, the fusion object information, and the information from the navigation ECU 70.

When the condition of S330 is satisfied, the CPU proceeds to S335 and queries the servers whether the moving speed of such an undetected right-facing moving object is equal to or higher than the first threshold speed. The server calculates the moving speed of the moving object from the change of the location of the moving object per unit time. The CPU then proceeds to S340 to determine whether the moving speed of the undetected right-facing moving object is equal to or higher than the first threshold speed based on the answer from the servers.

When the condition of S340 is satisfied, the CPU proceeds to S345 and executes the "first operation and second operation" described above. More specifically, the CPU sets an early automatic braking flag XB to "1". As a result, as will be described later, the collision determination condition is changed to a condition that is likely to be satisfied. The value of the early automatic braking flag XB is set to "O" by an initialization routine executed by the CPU when the host vehicle HV is started. Further, in S345, the CPU drives the brake actuator 51 by transmitting an instruction to the brake ECU 50 to execute the pre-filling operation described above. Thereafter, the CPU proceeds to S395 and ends the routine once.

When "No" in any of S305, S320, S325, S330 and S340 steps, the CPU proceeds to S395 from the step for which the determination result is "No." Further, when "No" in S310, the CPU proceeds to S350. In S350, the CPU determines whether the host vehicle intends to make a right turn. More specifically, the CPU determines whether the turn signal switch 94 is generating a signal for causing the right turn signal of the host vehicle HV to blink. The CPU may determine whether the host vehicle intends to make a right turn based on whether the in-vehicle navigation system guides a right turn at the intersection, or whether the host vehicle is traveling on a right-turn lane for the intersection. When the condition of S350 is not satisfied (where the host vehicle HV is attempting to travel straight through the intersection), the CPU proceeds to S315. When the condition of S350 is satisfied, the CPU proceeds to S395.

Right Turn

Figure 4:
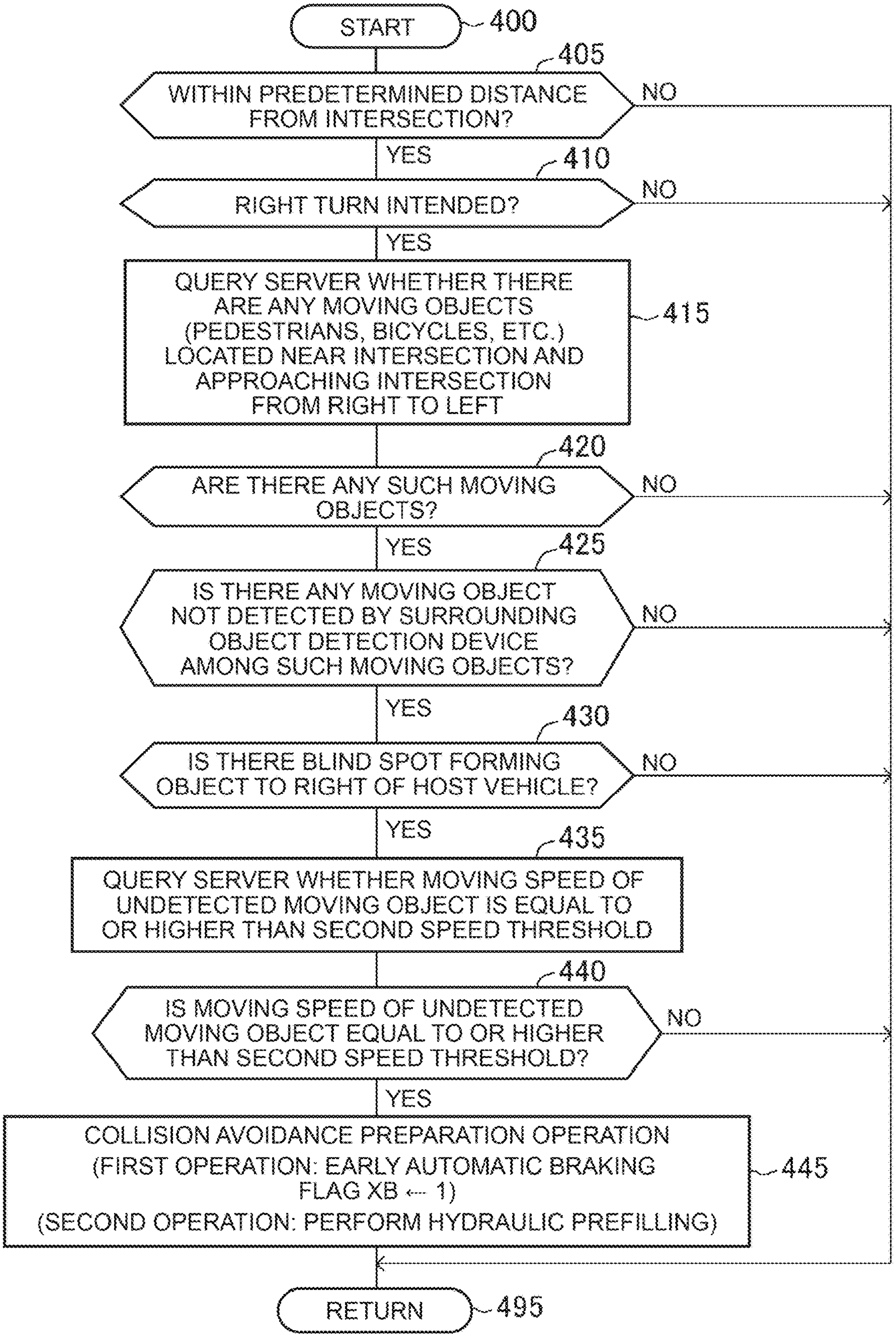
FIG. 4 is a routine that is executed by the CPU of the vehicle control ECU shown in FIG. 1.

At a predetermined timing, the CPU starts the process from S400 of FIG. 4 and proceeds to S405. In S405, the CPU determines whether the host vehicle is approaching the intersection and is within a predetermined distance from the intersection based on the information from the navigation ECU 70.

When the condition of S405 is satisfied, the CPU proceeds to S410 to determine whether the host vehicle intends to make a right turn. More specifically, the CPU determines whether the turn signal switch 94 is generating a signal for causing the right turn signal of the host vehicle HV to blink. The CPU may determine whether the host vehicle intends to make a right turn based on whether the in-vehicle navigation system guides a right turn at the intersection, or whether the host vehicle is traveling on a right-turn lane for the intersection.

When the condition of S410 is satisfied, the CPU proceeds to S415 to inquire whether there is a moving object (left-facing specific moving object) that is located near the intersection the host vehicle is approaching and that is moving from right to left toward the intersection, the CPU then determines in S420 whether there is a left-facing specific moving object based on the answers from the servers.

When the condition of S420 is satisfied, the CPU proceeds to S425. The CPU determines whether there is a moving object that is not detected by the surrounding object detection device among the left-facing specific moving objects based on the location of the left-facing specific moving object, the current location of the host vehicle, and the fusion object information received from the server.

When the condition of S425 is satisfied, the CPU proceeds to S430. The CPU determines whether there is a blind spot forming object between the left-facing specific moving object that has not been detected and the host vehicle HV, based on the location of the left-facing specific moving object, the fusion object information, and the information from the navigation ECU 70 received from the servers.

When the condition of S430 is satisfied, the CPU proceeds to S435 and queries the servers whether the moving speed of such an undetected left-facing moving object is equal to or higher than the second threshold speed. The CPU then proceeds to S440 to determine whether the moving speed of the undetected left-facing moving object is equal to or higher than the second threshold speed based on the answer from the servers.

When the condition of S440 is satisfied, the CPU proceeds to S445 and executes the "first operation and second operation" described above. Thereafter, the CPU proceeds to S495 and ends the routine once. When "No" in any of S405, S410, S420, S425, S430 and S440 steps, the CPU proceeds to S495 from the step for which the determination result is "No."

Collision Avoidance Assist

Figure 5:
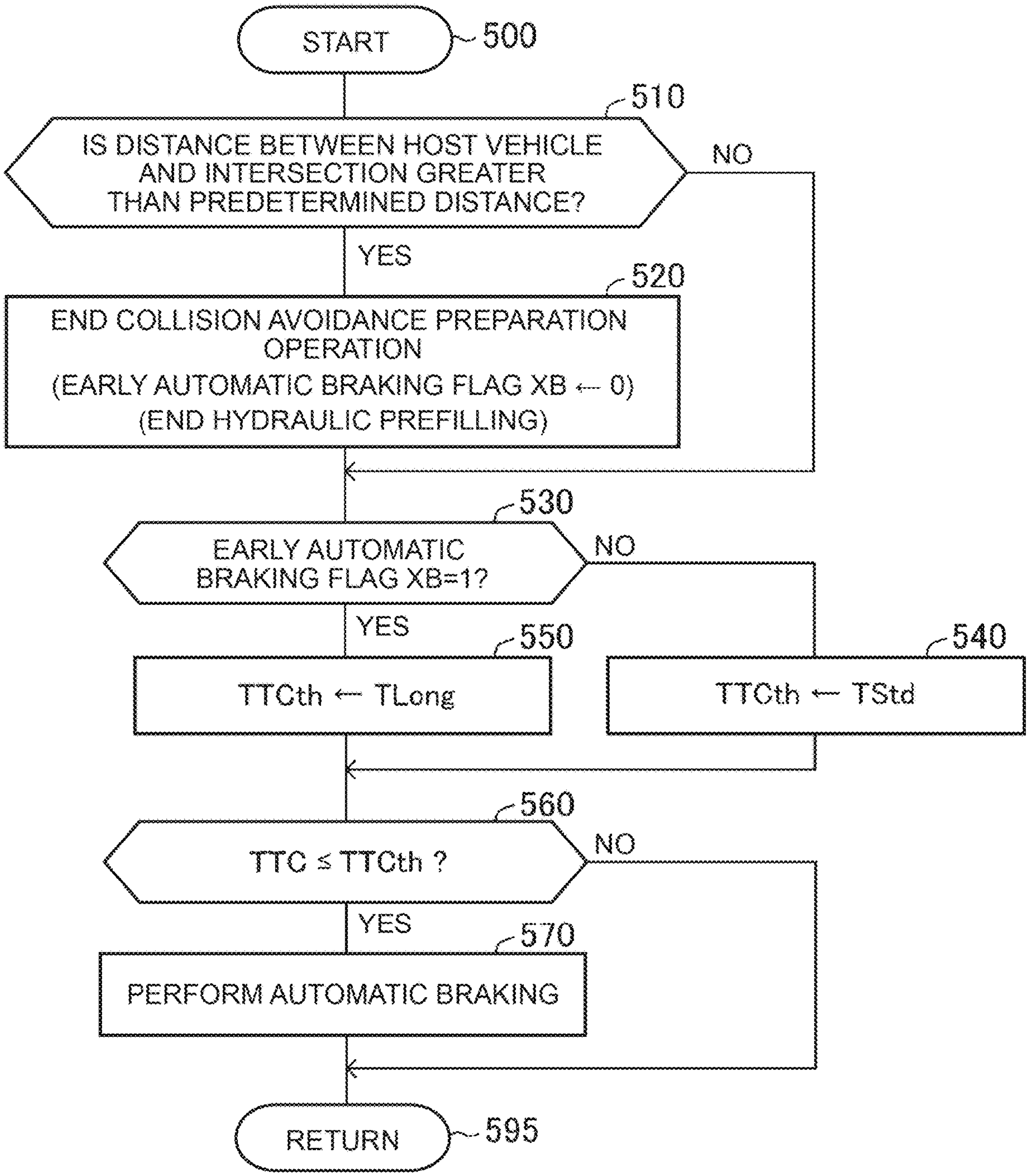
FIG. 5 is a routine that is executed by the CPU of the vehicle control ECU shown in FIG. 1.

At a predetermined timing, the CPU starts the process from S500 of FIG. 5 and proceeds to S510. In S510, the CPU determines whether the distance between the host vehicle and the intersection is larger than a predetermined distance based on the information from the navigation ECU 70. When the distance between the host vehicle and the intersection is not greater than the predetermined distance, the CPU proceeds directly from S510 to S530.

On the other hand, when the distance between the host vehicle and the intersection is larger than the predetermined distance, the CPU proceeds from S510 to S520. In S520, the CPU sets the early automatic braking flag XB to "0". Further, the CPU ends the above pre-filling operation by sending an instruction to the brake ECU 50. The CPU then proceeds to S530.

In S530, the CPU determines whether the early automatic braking flag XB is "1". When the value of the early automatic braking flag XB is not "1", the CPU proceeds to S540 and sets the collision determination threshold TTCth to the normal value Tstd. The CPU then proceeds to S560. On the other hand, when the value of the early automatic braking flag XB is "1", the CPU proceeds from S530 to S550 and sets the collision determination threshold TTCth to the early conversion value TLong. The early conversion TLong is greater than the normal Tstd. The CPU then proceeds to S560.

In S560, the CPU calculates a time required for the host vehicle to collide with the object (time to collision) TTC (=distance to the object/relative velocity of the object), and determines whether the time to collision TTC is equal to or less than the collision determination threshold TTCth. When the time to collision TTC is equal to or less than the collision determination threshold TTCth, the CPU proceeds to S570 and sends an instruction to the brake ECU 50 to execute the automated brake. Thereafter, the CPU proceeds to S595 and ends the routine once. On the other hand, when the time to collision TTC is not equal to or less than the collision determination threshold TTCth, the CPU proceeds directly from S560 to S595.

As described above, in the case where the host vehicle HV makes a left turn or a right turn at an intersection, the device DS executes the collision avoidance preparation operation when there is a moving object that is potentially highly likely to contact the host vehicle HV. That is, the device DS executes a collision avoidance preparation operation when the first situation or the second situation has occurred. Therefore, the possibility that the host vehicle HV may contact the moving object at the intersection can be reduced.

The present disclosure is not limited to the above embodiment and modification, and various modifications can be adopted within the scope of the present disclosure.

For example, the device DS may add the following condition L6 to the collision avoidance preparation condition at the time of a left turn.

Condition L6: A moving object that satisfies the condition L3 is a moving object located to the right of the host vehicle HV in the case where the host vehicle HV is assumed to have completed the left turn (see the moving object P1 in FIG. 2A).

That is, in S315, the CPU may inquire the server whether there is a moving object located to the right of the host vehicle among the right-facing moving objects in the case where the host vehicle is assumed to have completed the left turn at the intersection.

Similarly, the device DS may add the following condition R6 to the collision avoidance preparation condition at the time of a right turn.

Condition R6: A moving object that satisfies the condition R3 is a moving object that is located to the right of the host vehicle HV in the case where the host vehicle HV is assumed to have completed the right turn (see the moving object P8 in FIG. 2B).

That is, in S415, the CPU may inquire the server whether there is a moving object located to the right of the host vehicle out of the left-facing moving objects in the case where the host vehicle is assumed to have completed the right turn at the intersection.

Figure 6A:
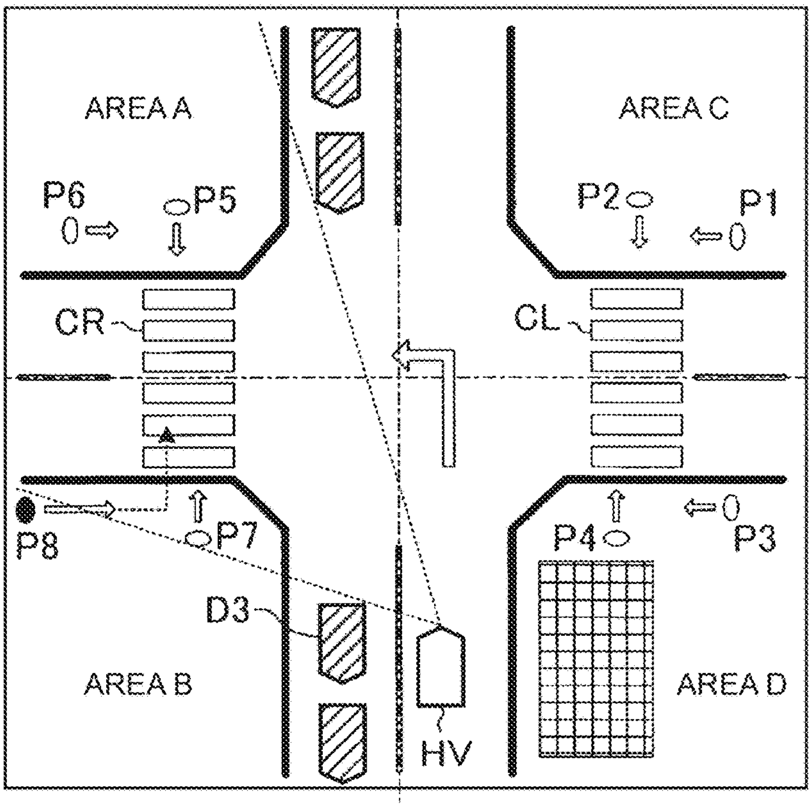
FIG. 6A is a plan view of an intersection when the host vehicle makes a left turn at an intersection in a right-side traffic area.

Further, in an area with a law that requires vehicles to drive on the right side of the road, the device DS may determine that the first condition (collision avoidance preparation condition) is satisfied and determine that the first situation has occurred when all of the following conditions LA1 to LA5 are satisfied (see FIG. 6A).

Condition L1A: The moving object is located near the "intersection the host vehicle HV is approaching."

Condition L2A: The moving object that satisfies the condition LIA is moving from the left side of the host vehicle HV before the left turn toward the intersection. That is, the moving object satisfying the condition LIA moves from left to right.

Condition L3A: The speed of the moving object satisfying the condition L2A is equal to or higher than the third threshold speed. The third threshold speed may be the same as either the first threshold speed or the second threshold speed.

Condition L4A: The moving object satisfying the condition L3A is not detected by the surrounding object detection device.

Condition L5A: There is a blind spot forming object between the moving object satisfying the condition LAA and the host vehicle HV. The device DS may further determine that the first condition is satisfied when the following condition L6A is satisfied.

Condition L6A: A moving object that satisfies the condition L3A is a moving object that is located to the left of the host vehicle HV when the host vehicle HV is assumed to have completed a left turn.

Figure 6B:
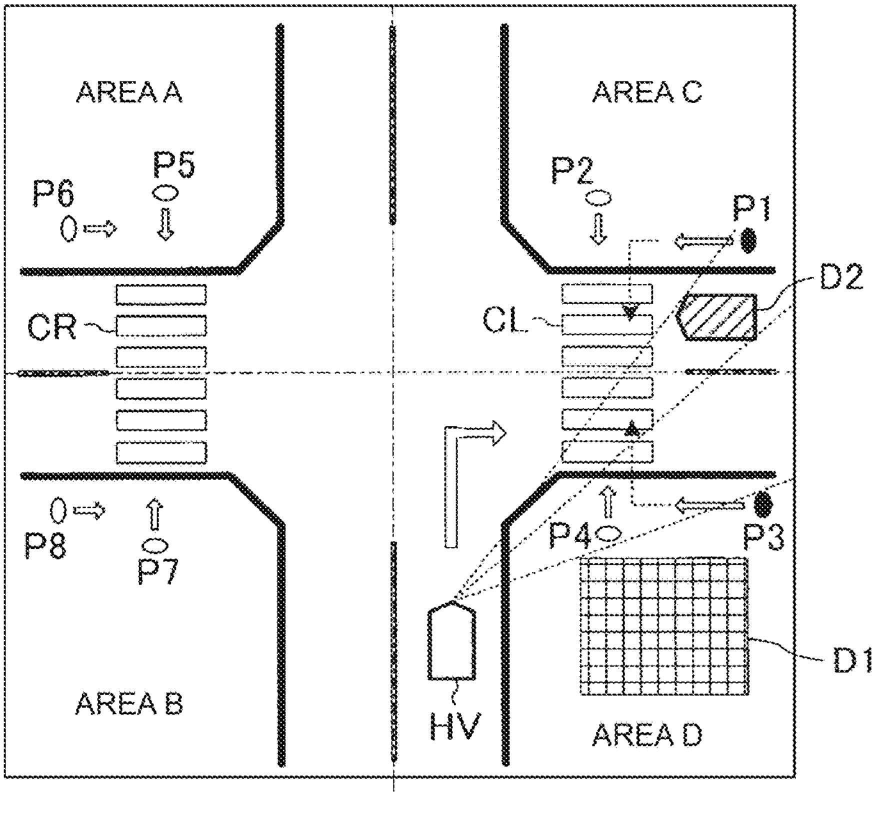
FIG. 6B is a plan view of an intersection when the host vehicle makes a right turn at the intersection in a right-side traffic area.

Further, in an area with a law that requires vehicles to drive on the right side of the road, the device DS may determine that the second condition (collision avoidance preparation condition) is satisfied and determine that the second situation has occurred when all of the following conditions RAI to RA5 are satisfied (see FIG. 6B).

Condition R1A: The moving object is located near the "intersection the host vehicle HV is approaching."

Condition R2A: The moving object satisfying the condition RIA is moving from the right side of the host vehicle HV before the right turn toward the intersection. That is, the moving object satisfying the condition RIA is moving from right to left.

Condition R3A: The speed of the moving object satisfying the condition R2A is equal to or higher than the fourth threshold speed. The fourth threshold speed may be the same as any of the first threshold speed, the second threshold speed, and the third threshold speed.

Condition R4A: The moving object satisfying the condition R3A is not detected by the surrounding object detection device.

Condition R5A: There is a blind spot forming object between the moving object satisfying the condition R4A and the host vehicle HV. The device DS may further determine that the second condition is satisfied when the following condition R6A is satisfied.

Condition R6A: A moving object that satisfies the condition R3A is a moving object that is located to the left of the host vehicle HV when the host vehicle HV is assumed to have completed a right turn.

What is claimed is:

1. A vehicle control device comprising:

a surrounding object detection device configured to detect an object located around a host vehicle and acquire object information on the object, the surrounding object detection device being implemented by a camera, a first electronic unit configured to communicate with the camera, a radar, and a second electronic control unit configured to communicate with the radar;

a brake actuator configured to execute a collision avoidance assist operation for avoiding a collision between the object and the host vehicle; and a controller configured to cause the brake actuator to execute the collision avoidance assist operation in a case where a collision determination condition is satisfied, the collision determination condition being a condition that is satisfied in a case where the object detected by the surrounding object detection device and the host vehicle are predicted to collide, wherein:

the controller is configured to execute either or both of a first operation and a second operation in a case where a specific situation occurs, the specific situation being either or both of a first situation and a second situation;

the first situation is a situation in which, in a case where the host vehicle is approaching an intersection and intends to make a left turn at the intersection, the controller recognizes, based on the object information and location information of a mobile phone carried by a first moving object, that a first condition including a condition that there is the first moving object is satisfied, the first moving object being a moving object that is not detected by the surrounding object detection device because the moving object is located within a blind spot of the surrounding object detection device and that is approaching the intersection at a speed equal to or higher than a first threshold speed from a left side of the host vehicle before the left turn;

the second situation is a situation in which, in a case where the host vehicle is approaching an intersection and intends to make a right turn at the intersection, the controller recognizes, based on the object information and location information of a mobile phone carried by a second moving object, that a second condition including a condition that there is the second moving object is satisfied, the second moving object being a moving object that is not detected by the surrounding object detection device because the moving object is located within the blind spot of the surrounding object detection device and that is approaching the intersection at a speed equal to or higher than a second threshold speed from a right side of the host vehicle before the right turn;

the first operation is an operation for changing the collision determination condition to a condition that is more likely to be satisfied than a condition in which the specific situation has not occurred; and the second operation is an operation for reducing a time from when the brake actuator is instructed to execute the collision avoidance assist operation until when the collision avoidance assist operation is actually started.

2. The vehicle control device according to claim 1, wherein:

the controller is further configured to, in an area with a law that requires a vehicle to drive on a left side of a road, determine that the first condition is satisfied in response to a determination that the first moving object is located to right of the host vehicle in a case where the host vehicle is assumed to have completed the left turn, and determine that the second condition is satisfied in response to a determination that the second moving object is located to the right of the host vehicle in a case where the host vehicle is assumed to have completed the right turn; and the controller is further configured to, in an area with a law that requires a vehicle to drive on a right side of a road, determine that the first condition is satisfied in response to a determination that the first moving object is located to left of the host vehicle in a case where the host vehicle is assumed to have completed the left turn, and determine that the second condition is satisfied in response to a determination that the second moving object is located to the left of the host vehicle in a case where the host vehicle is assumed to have completed the right turn.

3. The vehicle control device according to claim 1, further comprising an oil passage and a hydraulic brake that are connected to the brake actuator.

4. The vehicle control device according to claim 1, wherein the controller is further configured to:

set a value of an early automatic braking flag to "0" at activation of the host vehicle, the early automatic braking flag being used to change the collision determination condition for the collision avoidance assist operation; and set the value of the early automatic braking flag to "1" in the first operation in a case where the specific situation occurs.

5. The vehicle control device according to claim 3, wherein the controller is further configured to:

set a value of an early automatic braking flag to "0" at activation of the host vehicle, the early automatic braking flag being used to change the collision determination condition for the collision avoidance assist operation; and set the value of the early automatic braking flag to "1" in the first operation in a case where the specific situation occurs.

6. The vehicle control device according to claim 5, wherein the controller is further configured to perform a pre-filling operation for increasing a pressure of hydraulic oil in the oil passage and the hydraulic brake.

* * * * *